(12) United States Patent
Torres et al.

(10) Patent No.: US 12,228,142 B1
(45) Date of Patent: Feb. 18, 2025

(54) CONTROL OF LEAKAGE FOR GAS TURBINE ENGINE COMPRESSOR BLADES

(71) Applicant: RTX CORPORATION, Farmington, CT (US)

(72) Inventors: Luis Manuel Torres, Middletown, CT (US); Joshua W. Sampsell, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/365,304

(22) Filed: Aug. 4, 2023

(51) Int. Cl.
*F04D 29/32* (2006.01)
*F01D 5/30* (2006.01)
*F01D 5/32* (2006.01)
*F01D 11/00* (2006.01)
*F02C 3/06* (2006.01)
(Continued)

(52) U.S. Cl.
CPC ......... *F04D 29/322* (2013.01); *F01D 5/3007* (2013.01); *F01D 5/3015* (2013.01); *F01D 5/3069* (2013.01); *F01D 5/323* (2013.01); *F01D 5/326* (2013.01); *F01D 11/006* (2013.01); *F04D 29/083* (2013.01); *F04D 29/164* (2013.01); *F02C 3/06* (2013.01)

(58) Field of Classification Search
CPC .... F01D 5/3007; F01D 5/3015; F01D 5/3069; F01D 5/3076; F01D 5/323; F01D 5/326; F01D 11/006; F01D 11/008; F04D 29/322; F04D 29/164; F04D 29/083
See application file for complete search history.

(56) References Cited

U.S. PATENT DOCUMENTS 2,755,063 A 7/1956 Wilkinson
3,768,924 A * 10/1973 Corsmeier ............ F01D 5/3015
416/220 R
(Continued)

FOREIGN PATENT DOCUMENTS

FR 2974142 A1 10/2012
FR 2982635 A1 5/2013
(Continued)

OTHER PUBLICATIONS

European Search Report for EP Application No. 24192720.1 dated Dec. 13, 2024.

*Primary Examiner* — Christopher Verdier
(74) *Attorney, Agent, or Firm* — Carlson, Gaskey & Olds, P.C.

(57) ABSTRACT

A compressor section includes a compressor disk having a slot receiving a blade with an airfoil extending from a platform and the compressor disk having an upstream end and a downstream end. A cover plate at one of the upstream end and the downstream end covers an area between the blade and the compressor disk across a circumference of the compressor disk. The cover plate covers an area between an inner peripheral surface of the platform to a radially innermost end of the slot in the disk. The compressor disk has hooks, and there is a retention ring mounted in a cavity between the hooks and the compressor disk. The cover plate is mounted between the retention ring and the compressor disk. The retention ring retains the cover plate against the compressor disk. A gas turbine engine is also disclosed.

18 Claims, 6 Drawing Sheets

(51) Int. Cl.
*F04D 29/08* (2006.01)
*F04D 29/16* (2006.01)

(56) References Cited

U.S. PATENT DOCUMENTS

| | | | |
|---|---|---|---|
| 4,349,318 A * | 9/1982 | Libertini | F01D 5/326 |
| | | | 416/221 |
| 4,730,983 A | 3/1988 | Naudet et al. | |
| 4,854,821 A * | 8/1989 | Kernon | F01D 5/3015 |
| | | | 416/193 A |
| 5,211,407 A * | 5/1993 | Glynn | F01D 11/006 |
| | | | 277/637 |
| 5,257,909 A | 11/1993 | Glynn et al. | |
| 5,320,492 A | 6/1994 | Bouru et al. | |
| 11,512,602 B2 | 11/2022 | Knortz | |
| 2005/0042108 A1 | 2/2005 | Benderradji et al. | |
| 2005/0175463 A1 * | 8/2005 | Giot | F01D 11/008 |
| | | | 416/224 |
| 2005/0232772 A1 | 10/2005 | Race et al. | |
| 2012/0275920 A1 * | 11/2012 | Delvaux | F01D 5/3015 |
| | | | 416/204 R |
| 2014/0193272 A1 | 7/2014 | Giametta | |
| 2017/0009595 A1 * | 1/2017 | McCaffrey | F01D 11/006 |

FOREIGN PATENT DOCUMENTS

| | | | |
|---|---|---|---|
| WO | 2017/174723 A1 | 10/2017 | |
| WO | WO-2019/040171 A1 * | 2/2019 | |

* cited by examiner

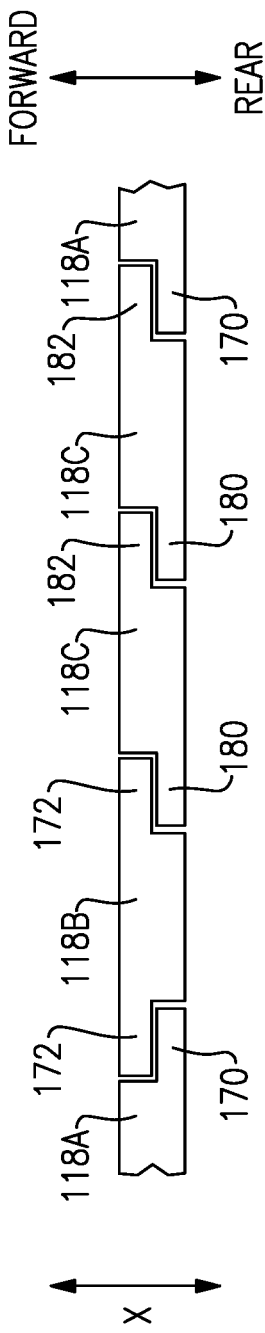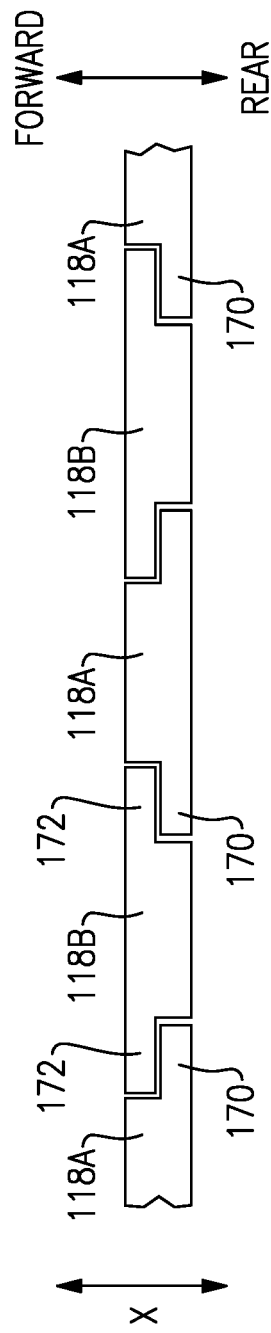

US 12,228,142 B1

CONTROL OF LEAKAGE FOR GAS TURBINE ENGINE COMPRESSOR BLADES

STATEMENT REGARDING FEDERALLY SPONSORED RESEARCH OR DEVELOPMENT

This invention was made with Government support awarded by the United States. The Government has certain rights in this invention.

BACKGROUND OF THE INVENTION

This application relates to controlling the amount of leakage between a gas turbine engine compressor blade and a disk mounting the blade.

Gas turbine engines are known, and typically include a fan or other propulsor delivering air into a core engine housing. A compressor section is mounted within the core engine housing. The air is compressed at the compressor section and delivered into a combustor where it is mixed with fuel and ignited. Products of this combustion pass downstream over turbine rotors, driving them to rotate.

Typical compressor sections include a rotating disk having a plurality of slots each mounting a mount structure from a compressor blade. There are potential leakage paths between a platform around the compressor blade and an outer peripheral surface of the disk. This is known as dead-rim leakage. There is also a potential leakage path at a radially inner end of the mount structure and the slot. This is known as live-rim leakage.

To include the efficiency of the gas turbine engine it would be desirable to control the amount of leakage.

SUMMARY OF THE INVENTION

In a featured embodiment, a compressor section includes a compressor disk having a slot receiving a blade with an airfoil extending from a platform and the compressor disk having an upstream end and a downstream end. A cover plate at one of the upstream end and the downstream end covers an area between the blade and the compressor disk across a circumference of the compressor disk. The cover plate covers an area between an inner peripheral surface of the platform to a radially innermost end of the slot in the disk. The compressor disk has hooks, and there is a retention ring mounted in a cavity between the hooks and the compressor disk. The cover plate is mounted between the retention ring and the compressor disk. The retention ring retains the cover plate against the compressor disk.

In another embodiment according to the previous embodiment, there is a surface in contact between the retention ring and an axially forward face of the hooks that has a component in an axially upstream direction and a radial direction such that upon loading due to centrifugal force the retention ring provides an axial bias force to hold the cover plate against an axial downstream end of the compressor disk.

In another embodiment according to any of the previous embodiments, the cover plate has a cover plate radially outer extent and there is a wire seal received in a cavity at the cover plate radial outer extent to seal between a radially outer portion of the compressor disk and a radially inner portion of the platform.

In another embodiment according to any of the previous embodiments, a platform seal is positioned between a radially outer surface of the compressor disk and a radially inner surface of the platform.

In another embodiment according to any of the previous embodiments, a platform seal is positioned between a radially outer surface of the compressor disk and a radially inner surface of the platform.

In another embodiment according to any of the previous embodiments, the cover plate has openings which pass over the hooks on the compressor disk.

In another embodiment according to any of the previous embodiments, an anti-windage feature extends circumferentially between the openings in the cover plate and extends away from a face of the cover plate to be received in a circumferential gap between adjacent ones of the hooks.

In another embodiment according to any of the previous embodiments, the anti-windage feature extends for a first circumferential extent, and adjacent ones of the hooks are spaced by a second circumferential distance, and the first circumferential distance being greater than 90% of the second circumferential distance.

In another embodiment according to any of the previous embodiments, there are a plurality of cover plate portions each having tongues to ship-lap with tongues on adjacent ones of the cover plate sections.

In another embodiment according to any of the previous embodiments, the cover plate is at the downstream end.

In another featured embodiment, a gas turbine engine includes a turbine section, a compressor section and a combustor. The compressor section has a compressor disk having a slot receiving a blade with an airfoil extending from a platform and the compressor disk having an upstream end and a downstream end. A cover plate is at one of the upstream end and the downstream end and covers an area between the blade and the compressor disk across a circumference of the compressor disk. The cover plate covers an area between an inner peripheral surface of the platform to a radially innermost end of the slot in the disk. The compressor disk has hooks, and there is a retention ring mounted in a cavity between the hooks and the compressor disk. The cover plate is mounted between the retention ring and the compressor disk. The retention ring retaining the cover plate against the compressor disk.

In another embodiment according to any of the previous embodiments, there is a surface in contact between the retention ring and an axially forward face of the hooks that has a component in an axially upstream direction and a radial direction such that upon loading due to centrifugal force the retention ring provides an axial bias force to hold the cover plate against an axial downstream end of the compressor disk.

In another embodiment according to any of the previous embodiments, the cover plate has a cover plate radially outer extent and there is a wire seal received in a cavity at the cover plate radial outer extent to seal between a radially outer portion of the compressor disk and a radially inner portion of the platform.

In another embodiment according to any of the previous embodiments, a platform seal is positioned between a radially outer surface of the compressor disk and a radially inner surface of the platform.

In another embodiment according to any of the previous embodiments, a platform seal is positioned between a radially outer surface of the compressor disk and a radially inner surface of the platform.

In another embodiment according to any of the previous embodiments, the cover plate has openings which pass over the hooks on the compressor disk.

In another embodiment according to any of the previous embodiments, an anti-windage feature extends circumferentially between the openings in the cover plate and extends away from a face of the cover plate to be received in a circumferential gap between adjacent ones of the hooks.

In another embodiment according to any of the previous embodiments, the anti-windage feature extends for a first circumferential extent, and adjacent ones of the hooks are spaced by a second circumferential distance, and the first circumferential distance being greater than 90% of the second circumferential distance.

In another embodiment according to any of the previous embodiments, there are a plurality of cover plate portions each having tongues to ship-lap with tongues on adjacent ones of the cover plate sections.

In another embodiment according to any of the previous embodiments, the cover plate is at the downstream end.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 7A shows a first embodiment cover plate assembly.
FIG. 7B shows a second embodiment cover plate option.

DETAILED DESCRIPTION

Figure 1:
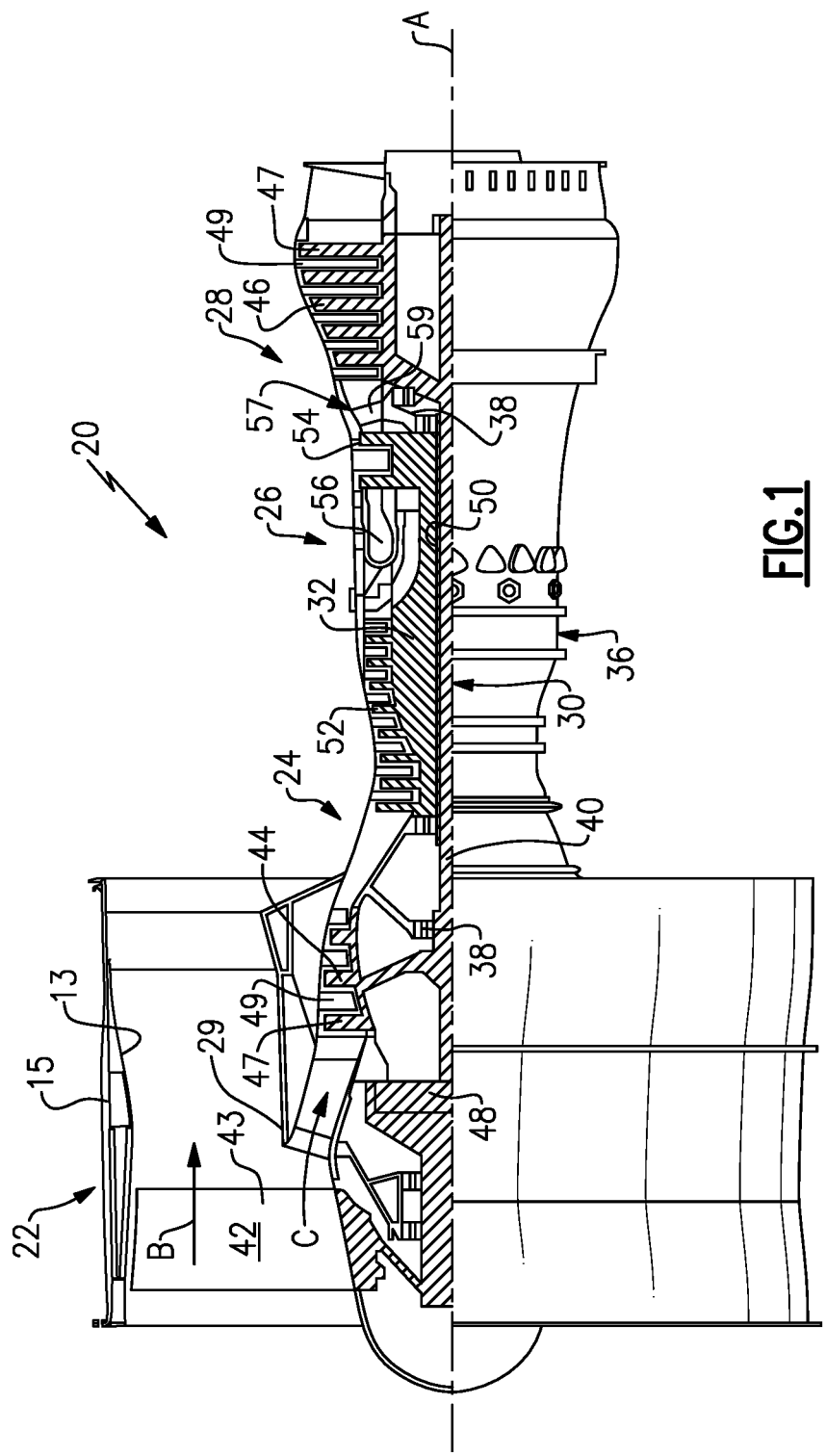
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust. As another example, the engine 20 may incorporate a multi-stage fan.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement. Of course, engines having other numbers of the fan blade may come under this disclosure.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
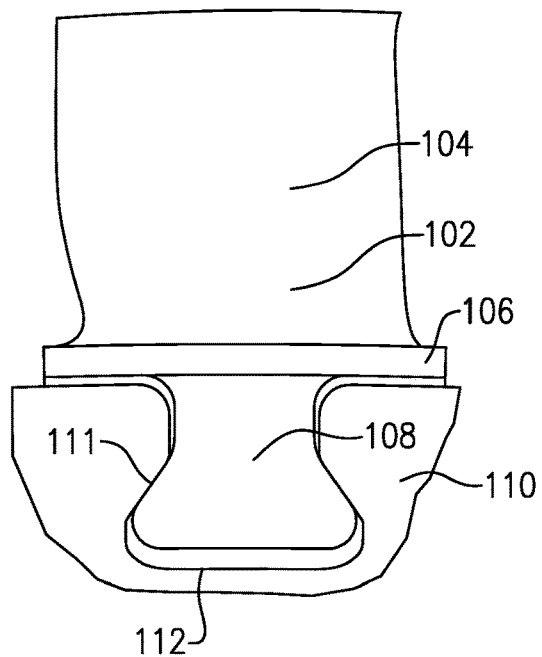
FIG. 2A shows a prior art compressor blade.

FIG. 2A shows a prior art compressor section 100 having compressor blades 102 with an airfoil portion 104 and a platform 106. A mount portion 108, known as a dovetail, extends radially inwardly from the platform 106 and is received within slots 111 in a rotating disk 110. As shown, the slot 111 has a radially innermost extent 112.

Figure 2B:
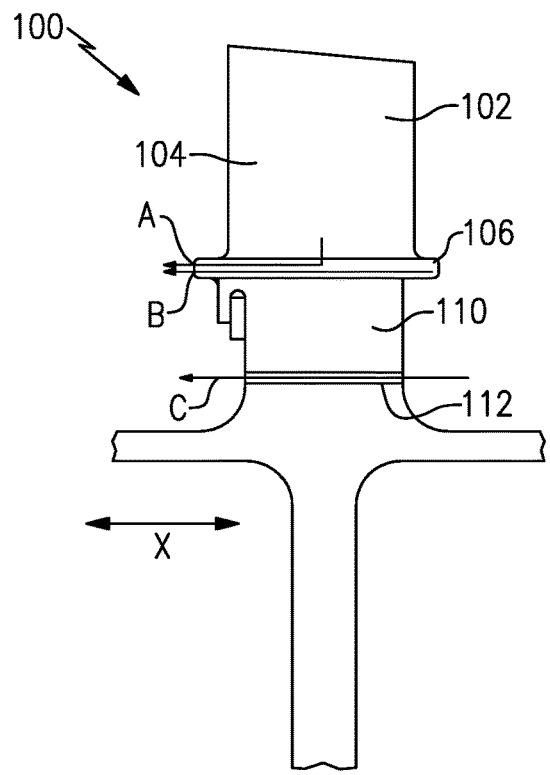
FIG. 2B shows the FIG. 2A compressor blade rotated by 90 degrees.

FIG. 2B shows the prior art assembly 100. As shown, there is potential gas path leakage at A. This leakage can go through a gap 550 (see FIG. 5) between circumferential edges of adjacent platforms. There is also dead-rim leakage at B between a radially inner surface of the platform 106 and a radially outer surface of the disk 110. Further, there is potential live-rim leakage C at the lowermost end 112 of the slot 111 and the mount portion 108 of the blade 102.

Figure 3:
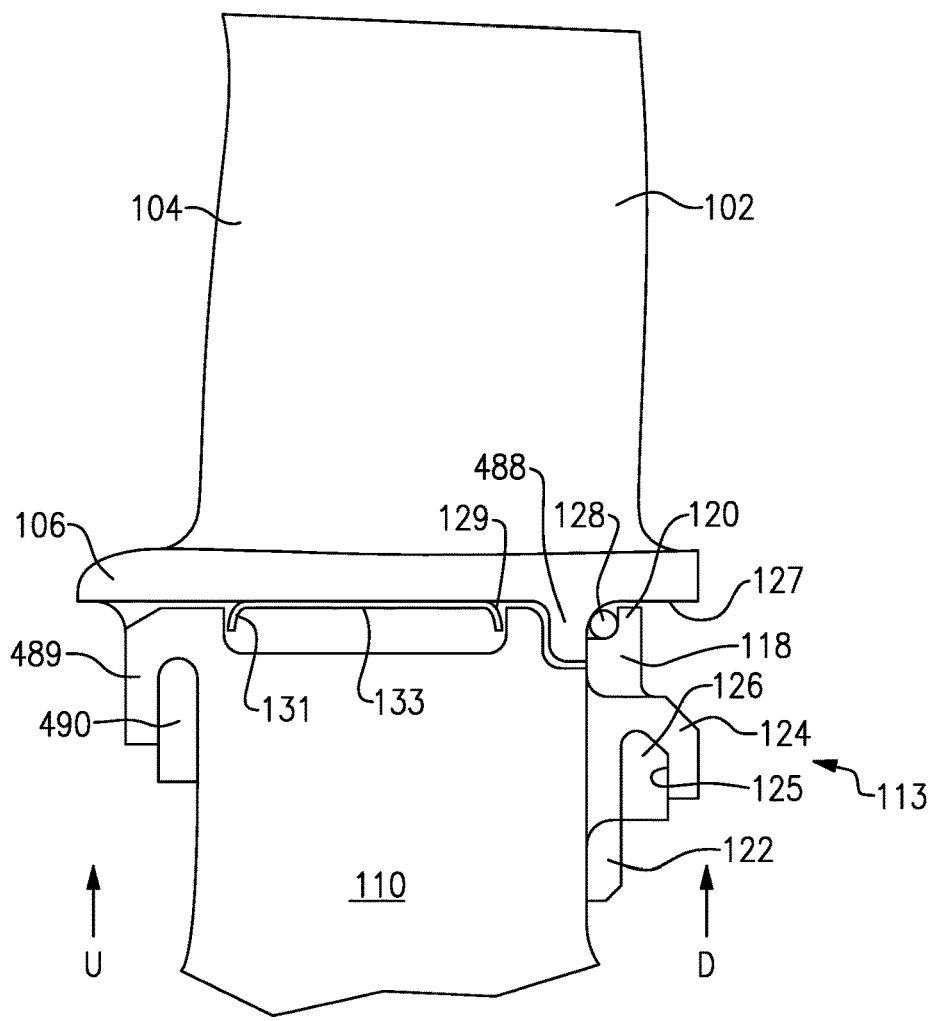
FIG. 3 shows a disclosed structure to control leakage between the compressor blade and a disk.

FIG. 3 shows an assembly 113 intended to control the amount of leakage at all these areas. A cover plate 118 is mounted at a downstream end D. An upstream end U is also shown.

A cover plate 118 seals the leakage paths between the blade 102 and the disk 110. Cover plate 118 has a radially innermost end 122 which extends beyond the radially innermost end 112 of the slot 111.

Hooks 124 on the disk 110 receive retention rings 126 in a cavity 125. The retention ring 126 holds the cover plate 118 against an end face of the disk 110. The cover plate 118 has a radially outermost end 120 spaced from a radially inner surface 127 of platform 106. Wire seal 128 sits within the radially outermost end 120 of the cover plate 118 and provide further sealing. The cover-plate 118 is in radial contact with the disk creating a tiny radial gap between the cover-plate and the blade. The wire seal 128 blocks the radial gap between the cover-plate and the blade. Rail 488 holds wire seal 128 axially in place and provides further sealing to a gap between end 120 and surface 127.

A platform seal 129 sits between the platform 106 and the disk 110. Platform seal 129 has a central portion 133 extending to radially inward extending axial ends 131. With the disclosed arrangement, all three of the leakage paths discussed in prior art FIG. 2B are controlled and minimized.

An upstream retention ring 490 is also positioned within upstream hooks 489.

Figure 4:
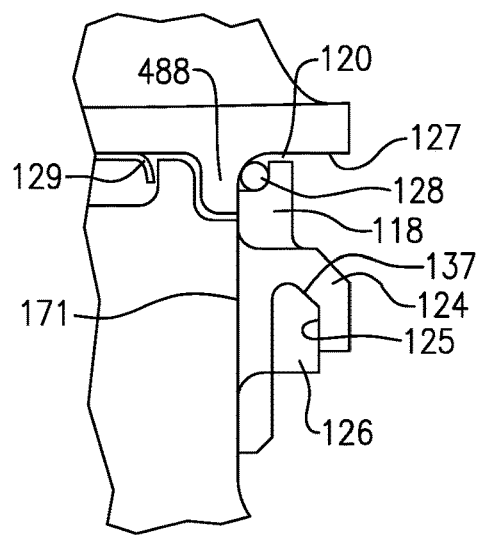
FIG. 4 shows a detail of the FIG. 3 structure.

FIG. 4 shows a detail, wherein the hook 124 and its cavity 125 has an angled contact area 137 with the retention ring 126. When centrifugally loaded area 137 creates an axial force on the retention ring forcing the cover plate against an axially downstream end 171 of the disk 110. This ensures the cover plate does not open to create gaps during operating of the gas turbine engine.

Figure 5:
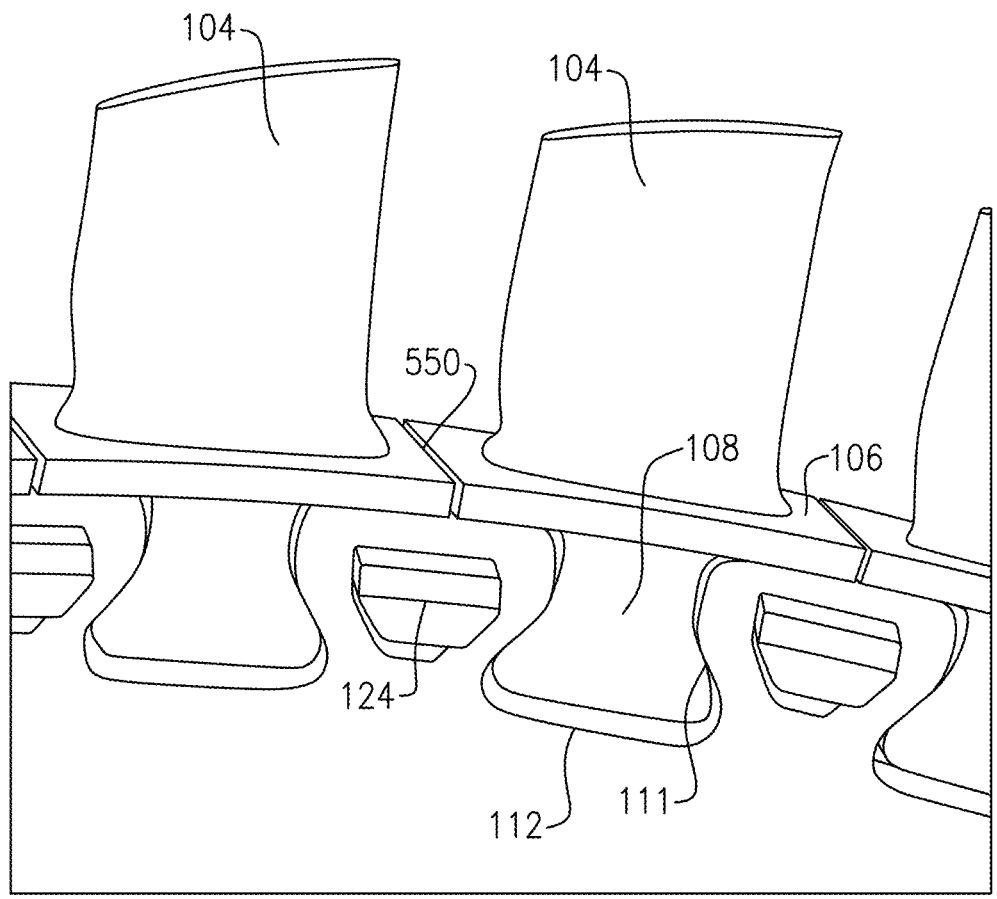
FIG. 5 shows yet another detail.

FIG. 5 shows the slots 111 and hooks 124.

Figure 6A:
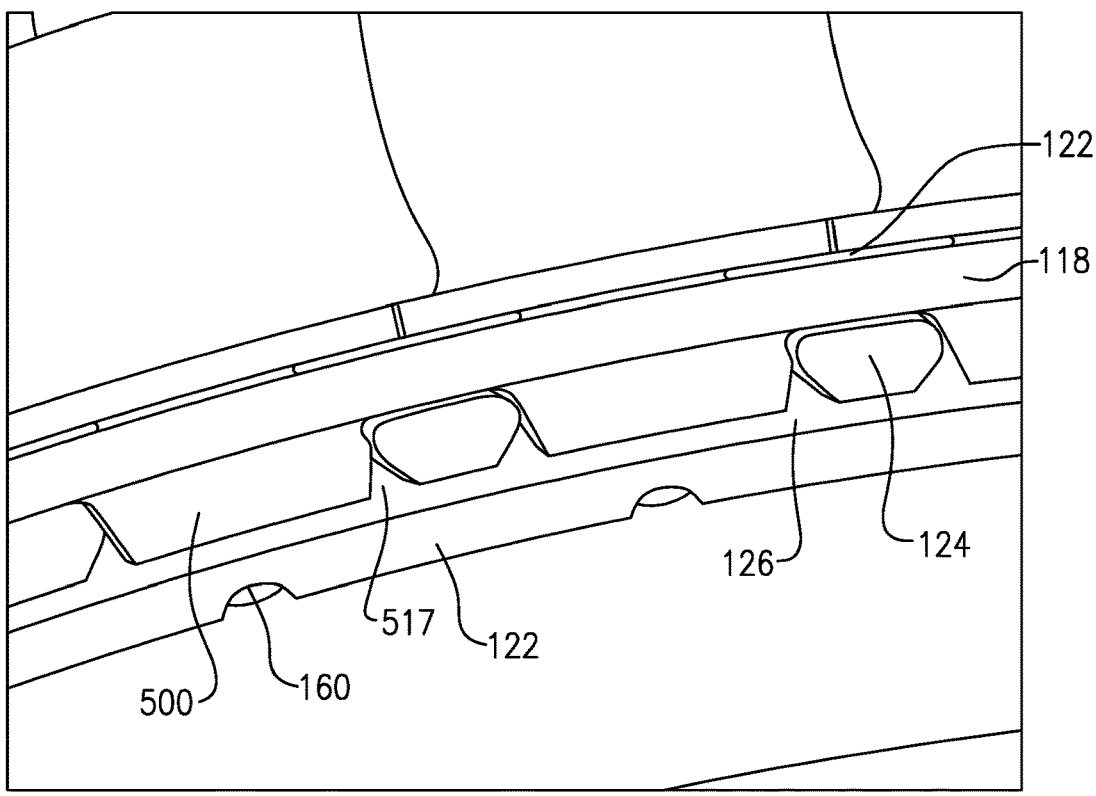
FIG. 6A shows another detail of the mount structure.

FIG. 6A shows further details of the cover plate 118. Here one can see "mouse-holes" 160 at the radially inner end 122. This allows some leakage of cooling air to cool the structure. In this sense, the cover plate 118 does not seek to eliminate leakage, but rather to control it. It should be understood that the present disclosure is not limited to the example embodiment in FIG. 6A and may include any number and size of "mouse-holes" needed to achieve the desired cooling air flow. For example, the cover plate may have no "mouse-holes," or it may have a "mouse-hole" at each blade position or at every other blade position.

Figure 6B:
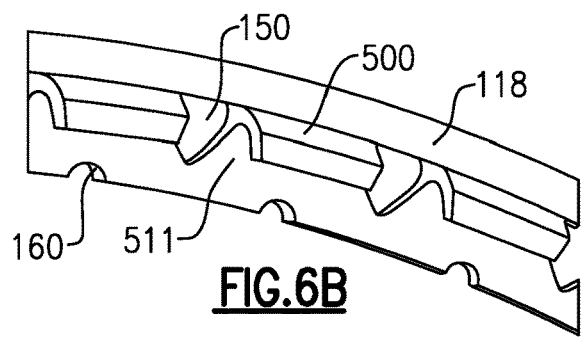
FIG. 6B shows a first cover embodiment.

FIG. 6B shows the cover 118 having an anti-windage feature 500. Essentially, feature 500 extends away from a face 511 of the cover. As can be seen when comparing FIGS. 6A and 6B, the anti-windage feature 500 is generally received within a gap 517 between adjacent ones of the hooks 124. Openings 150 are received over hooks 124. The anti-windage feature 500 reduces windage that otherwise could occur during rotation of the spaced hooks 124.

Figure 6C:
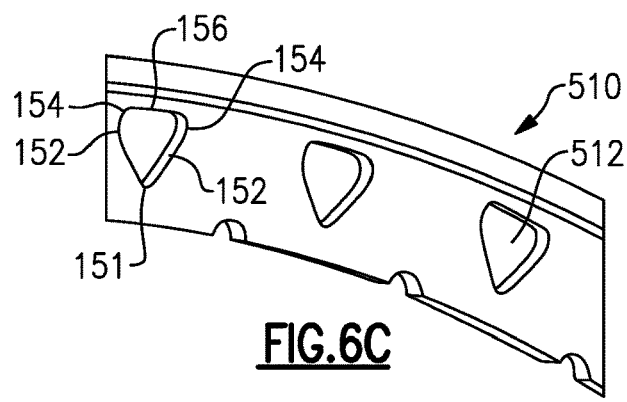
FIG. 6C shows a second cover embodiment.

FIG. 6C shows a cover embodiment 510 wherein the openings 512 do not have intermediate anti-windage features. Openings 512 (and in the FIGS. 6A and 6B embodiment) extend from inner apex 151 into surfaces 152 that are angled to have a circumferential and radially outward component. In embodiments the angle between apex 151 and the surfaces 152 is approximately 45 degrees. Angled portions 152 extend into curved portions 154, and then into outer portion 156. The use of the angled portions reduces stress concentrations.

The anti-windage feature extends for a first circumferential distance, and adjacent ones of the hooks are spaced by a second circumferential distance, and the first circumferential distance being greater than 90% of the second circumferential distance.

FIG. 7A shows another feature wherein there may be three types of cover plates 118a, 118b and 118c. The cover plates are ship-lapped between each other to eliminate line of sight leakage from adjacent cover plates. In embodiments there may be four cover plate sections extending around the entire circumference of the compressor section. Of course, other numbers of sections could be utilized.

In this embodiment the cover plate 118A has axially rear tongues 170 at each of two circumferential ends. The cover plate section 118B has axially forward tongues 172 at each of two circumferential ends. A third cover plate section 118C has one axially rear tongue 180 and one axially forward tongue 182. Thus, the four sections ship-lap to each other to eliminate line of sight leakage. It should be understood that the circumferential extent of the illustrated sections is limited simply to show the relationship of the tongues. Also, they will be part circular to extend around the disk. As mentioned above, in embodiments the four sections could extend around the entire circumference. Of course, other numbers of sections may be used.

FIG. 7B shows another embodiment wherein there are two cover plate sections 118A and two cover plate sections 118B. Each cover plate section 118A has rear tongues 170 at each circumferential end. Each cover plate type 118B has forward tongues 172 at each circumferential end.

While this disclosure has shown the cover plate and its associated structure at an axially rear end of the disk, it could also be utilized at the forward end, or at both ends.

A gas turbine engine comprising under this disclosure could be said to include a turbine section, a compressor section and a combustor. The compressor section has a compressor disk having a slot receiving a blade. An airfoil extends from a platform and the compressor disk has an upstream end and a downstream end. A cover plate covers an area between the blade and the compressor disk across a circumference of the compressor disk. The cover plate covers an area between an inner peripheral surface of the platform to a radially innermost end of the slot in the disk.

The compressor disk has hooks and a retention ring behind the hooks that holds the cover plate against the disk.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A compressor section comprising:
a compressor disk having a slot receiving a blade with an airfoil extending from a platform and the compressor disk having an upstream end and a downstream end;
a cover plate at one of the upstream end and the downstream end, and covering an area between the blade and the compressor disk across a circumference of the compressor disk, the cover plate covering an area between an inner peripheral surface of the platform to a radially innermost end of the slot in the disk;
the compressor disk having hooks, and there being a retention ring mounted in a cavity between the hooks and the compressor disk, with the cover plate mounted between the retention ring and the compressor disk, the retention ring retaining the cover plate against the compressor disk;
wherein the cover plate has openings which pass over the hooks on the compressor disk; and
wherein an anti-windage feature extends circumferentially between the openings in the cover plate and extends away from a face of the cover plate to be received in a circumferential gap between adjacent ones of the hooks.

2. The compressor section as set forth in claim 1, wherein there being a surface in contact between the retention ring and an axially forward face of the hooks that has a component in an axially upstream direction and a radial direction such that upon loading due to centrifugal force the retention ring provides an axial bias force to hold the cover plate against an axial downstream end of the compressor disk.

3. The compressor section as set forth in claim 1, wherein the cover plate having a cover plate radially outer extent and there being a wire seal received in a cavity at the cover plate radial outer extent to seal between a radially outer portion of the compressor disk and a radially inner portion of the platform.

4. The compressor section as set forth in claim 3, wherein a platform seal is positioned between a radially outer surface of the compressor disk and a radially inner surface of the platform.

5. The compressor section as set forth in claim 1, wherein a platform seal is positioned between a radially outer surface of the compressor disk and a radially inner surface of the platform.

6. The compressor section as set forth in claim 1, wherein the anti-windage feature extends for a first circumferential extent, and adjacent ones of the hooks are spaced by a second circumferential distance, and the first circumferential distance being greater than 90% of the second circumferential distance.

7. The compressor section as set forth in claim 1, wherein there are a plurality of cover plate portions each having tongues to ship-lap with tongues on adjacent ones of said cover plate portions.

8. The compressor section as set forth in claim 1, wherein the cover plate is at the downstream end.

9. A gas turbine engine comprising:
a turbine section, a compressor section and a combustor;
the compressor section having a compressor disk having a slot receiving a blade with an airfoil extending from a platform and the compressor disk having an upstream end and a downstream end;
a cover plate at one of the upstream end and the downstream end, and covering an area between the blade and the compressor disk across a circumference of the compressor disk, the cover plate covering an area between an inner peripheral surface of the platform to a radially innermost end of the slot in the disk;
the compressor disk having hooks, and there being a retention ring mounted in a cavity between the hooks and the compressor disk, with the cover plate mounted between the retention ring and the compressor disk, and said retention ring contacting at least one of the hooks, the retention ring retaining the cover plate against the compressor disk;
wherein the cover plate has openings which pass over the hooks on the compressor disk; and
wherein an anti-windage feature extends circumferentially between the openings in the cover plate and extends away from a face of the cover plate to be received in a circumferential gap between adjacent ones of the hooks.

10. The gas turbine engine as set forth in claim 9, wherein there being a surface in contact between the retention ring and an axially forward face of the hooks that has a component in an axially upstream direction and a radial direction such that upon loading due to centrifugal force the retention ring provides an axial bias force to hold the cover plate against an axial downstream end of the compressor disk.

11. The gas turbine engine as set forth in claim 9, wherein the cover plate having a cover plate radially outer extent and there being a wire seal received in a cavity at the cover plate radial outer extent to seal between a radially outer portion of the compressor disk and a radially inner portion of the platform.

12. The gas turbine engine as set forth in claim 11, wherein a platform seal is positioned between a radially outer surface of the compressor disk and a radially inner surface of the platform.

13. The gas turbine engine as set forth in claim 9, wherein a platform seal is positioned between a radially outer surface of the compressor disk and a radially inner surface of the platform.

14. The gas turbine engine as set forth in claim 9, wherein the anti-windage feature extends for a first circumferential extent, and adjacent ones of the hooks are spaced by a second circumferential distance, and the first circumferential distance being greater than 90% of the second circumferential distance.

15. The gas turbine engine as set forth in claim 9, wherein there are a plurality of cover plate portions each having tongues to ship-lap with tongues on adjacent ones of said cover plate portions.

16. The compressor section as set forth in claim 9, wherein the cover plate is at the downstream end.

17. A gas turbine engine comprising:
a turbine section, a compressor section and a combustor;
the compressor section having a compressor disk having a slot receiving a blade with an airfoil extending from a platform and the compressor disk having an upstream end and a downstream end;
a cover plate at one of the upstream end and the downstream end, and covering an area between the blade and the compressor disk across a circumference of the compressor disk, the cover plate covering an area between an inner peripheral surface of the platform to a radially innermost end of the slot in the disk;

the compressor disk having hooks, and there being a retention ring mounted in a cavity between the hooks and the compressor disk, with the cover plate mounted between the retention ring and the compressor disk, and said retention ring contacting at least one of the hooks, the retention ring retaining the cover plate against the compressor disk;

wherein an anti-windage feature extends circumferentially between the openings in the cover plate and extends away from a face of the cover plate to be received in a circumferential gap between adjacent ones of the hooks; and wherein the cover plate has openings which pass over the hooks on the compressor disk.

18. The gas turbine engine as set forth in claim 17, wherein the anti-windage feature extends for a first circumferential extent, and adjacent ones of the hooks are spaced by a second circumferential distance, and the first circumferential distance being greater than 90% of the second circumferential distance.

\* \* \* \* \*